(12) United States Patent
Busha et al.

(10) Patent No.: US 7,591,296 B2
(45) Date of Patent: Sep. 22, 2009

(54) TWO PIECE REMOVABLE END CAP

(75) Inventors: Bryan Busha, Grand Blanc, MI (US);
Joseph P. Wieczorek, Lake Orion, MI (US); Leslie R. Hinds, Oxford, MI (US)

(73) Assignee: Irvin Automotive Products, Inc., Pontiac, MI (US)

( * ) Notice: Subject to any disclaimer, the term of this patent is extended or adjusted under 35 U.S.C. 154(b) by 0 days.

(21) Appl. No.: 11/975,213

(22) Filed: Oct. 17, 2007

(65) Prior Publication Data

US 2009/0102226 A1   Apr. 23, 2009

(51) Int. Cl.
    E06B 9/17    (2006.01)
(52) U.S. Cl. ...................... 160/24; 160/323.1
(58) Field of Classification Search ............... 160/24, 160/39, 323.1, 370.22, 178.1 R; 211/105.3; 296/37.16; 248/267, 272; 16/427, 729; 403/308
See application file for complete search history.

(56) References Cited

U.S. PATENT DOCUMENTS

| | | | |
|---|---|---|---|
| 226,453 A | 4/1880 | Kelly | |
| 765,225 A | 7/1904 | Colin | |
| 1,716,285 A | 6/1929 | Szako | |
| 1,762,776 A | 6/1930 | Gardner | |
| 2,379,984 A | 7/1945 | Nereaux | |
| 3,180,606 A | 4/1965 | Sabin | |
| 3,235,219 A | 2/1966 | Green | |
| 4,059,938 A | 11/1977 | Almar | |
| 4,139,231 A | 2/1979 | Lang et al. | |
| 4,168,094 A * | 9/1979 | Yagi | 296/37.16 |
| 4,215,895 A | 8/1980 | Phillips | |
| 4,220,367 A | 9/1980 | Gale et al. | |
| 4,343,245 A | 8/1982 | Edwards | |
| 4,399,857 A | 8/1983 | Honma | |
| 4,502,674 A | 3/1985 | White et al. | |
| 4,527,760 A | 7/1985 | Salacuse | |
| 4,668,001 A | 5/1987 | Okumura et al. | |
| 4,671,557 A | 6/1987 | Lemp | |
| 4,781,234 A | 11/1988 | Okumura et al. | |
| 4,783,113 A | 11/1988 | Padlo | |
| 4,830,203 A | 5/1989 | Ennis | |
| 4,932,704 A | 6/1990 | Ament | |
| 5,031,682 A | 7/1991 | Tedeschi | |
| 5,054,837 A | 10/1991 | Chapman | |
| 5,105,871 A | 4/1992 | Baud et al. | |
| 5,437,474 A | 8/1995 | Ament | |
| 5,464,052 A | 11/1995 | Wieczorek | |
| 5,551,726 A | 9/1996 | Ament | |
| 5,618,077 A | 4/1997 | Ament et al. | |
| 5,676,415 A | 10/1997 | Ament et al. | |
| 5,813,449 A | 9/1998 | Patmore et al. | |
| 5,857,725 A | 1/1999 | Croke | |
| 5,934,354 A | 8/1999 | Price et al. | |
| 5,947,358 A | 9/1999 | Wieczorek | |
| 5,961,172 A | 10/1999 | Ament et al. | |

(Continued)

*Primary Examiner*—Blair M. Johnson
(74) *Attorney, Agent, or Firm*—Raggio & Dinnin, P.C.

(57) ABSTRACT

A support assembly for use on a shade in a vehicle is disclosed. The support assembly includes a base end cap and a nose insulator secured to an end of the base end cap. The support assembly also includes a removable extension arranged over the nose insulator and a portion of the base end cap. A second nose insulator is secured to an end of the removable extension for interaction with an inside surface of the vehicle.

11 Claims, 3 Drawing Sheets

U.S. PATENT DOCUMENTS

| | | | |
|---|---|---|---|
| 6,039,105 A | 3/2000 | Patmore et al. | |
| 6,125,908 A | 10/2000 | Ament et al. | |
| 6,213,186 B1 | 4/2001 | Torres et al. | |
| 6,279,639 B1 | 8/2001 | Schlecht et al. | |
| 6,483,027 B1 | 11/2002 | Howard et al. | |
| 6,488,325 B1 | 12/2002 | Ehrenberger et al. | |
| 6,557,572 B2 * | 5/2003 | Lah | 135/114 |
| 6,592,165 B2 | 7/2003 | Ament et al. | |
| 6,709,039 B1 | 3/2004 | Davenport | |
| 6,715,525 B2 | 4/2004 | Ehrenberger | |
| 6,913,303 B2 | 7/2005 | Kobiela et al. | |
| 6,921,199 B2 | 7/2005 | Haspel et al. | |
| 6,925,686 B2 * | 8/2005 | Heathcock et al. | 16/429 |
| 6,966,591 B2 | 11/2005 | Schlecht | |
| 7,014,239 B2 | 2/2006 | Ehrenberger | |
| 7,017,965 B2 | 3/2006 | Sitzler et al. | |
| 7,021,692 B2 | 4/2006 | Laudenbach et al. | |
| 7,028,872 B2 | 4/2006 | Lobanoff | |
| 7,337,823 B2 * | 3/2008 | Wieczorek et al. | 160/24 |
| 7,392,834 B2 * | 7/2008 | Davenport et al. | 160/24 |
| 2003/0135955 A1 * | 7/2003 | Dove | 16/429 |
| 2006/0254727 A1 * | 11/2006 | Cheng | 160/178.1 R |
| 2007/0012408 A1 * | 1/2007 | Cheng | 160/178.1 R |
| 2007/0170134 A1 * | 7/2007 | Bishop et al. | 211/105.1 |
| 2008/0163990 A1 * | 7/2008 | Hammond et al. | 160/323.1 |

* cited by examiner

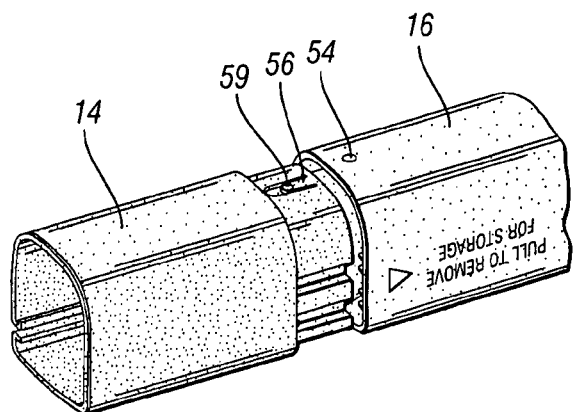
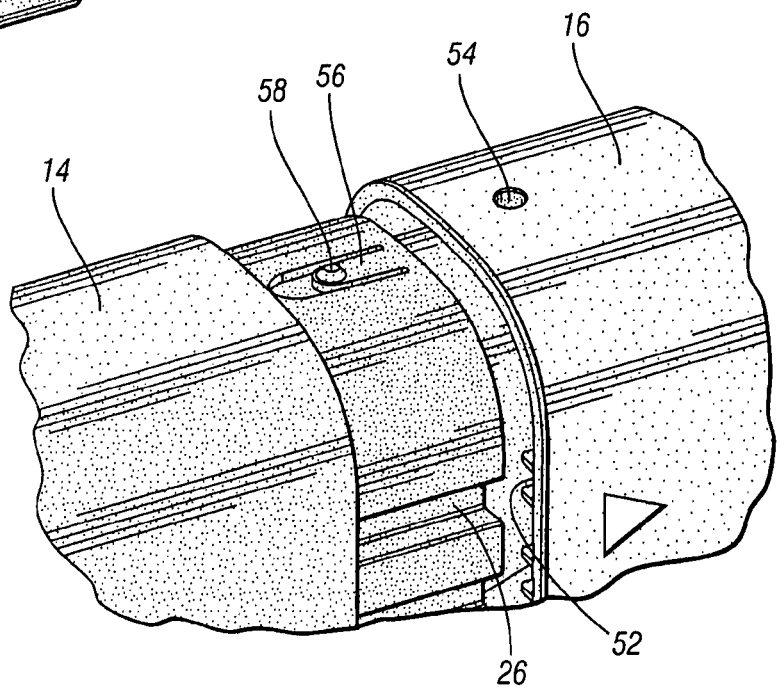
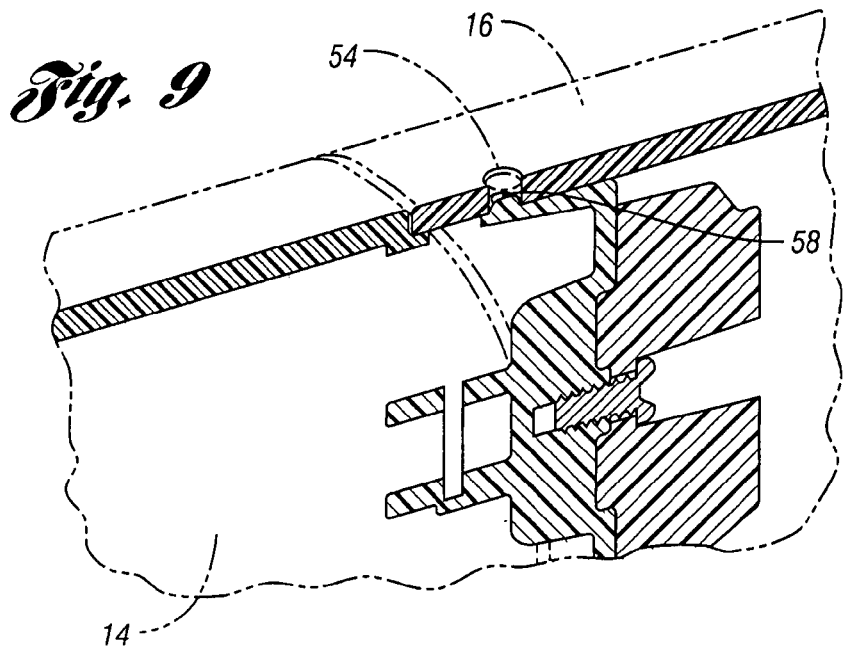

TWO PIECE REMOVABLE END CAP

BACKGROUND OF THE INVENTION

1. Field of the Invention

The subject invention generally relates to vehicle roller shade assemblies, and more particularly relates to a vehicle roller shade assembly having a two piece removable end cap.

2. Description of Related Art

Security shades, covers, tie downs and nets have been used in vehicle for decades to hide and stabilize content of cargo areas in vehicles. Covers or shades are particularly used to obscure the visibility of the contents of cargo areas which are visible from the outside of the vehicle. An example of this in the prior art is a cargo space of a sports utility vehicle (SUV) wherein the cargo area is typically most visible through the rear windows behind the seat or the rear window. Protectable shades are drawn over the cargo area to obscure any levels below the bottom of the windows and typically somewhat below the highest end of the second row seats when in the upright position. For many designs it is difficult to gain access under items under the cover without opening the rear of the vehicle. One key feature of the present device is the ability to use the security shade in a variety of positions within the automotive vehicle, thus requiring a change in the length of the roller or end caps for the security shade to allow for such variety of uses within an automotive vehicle interior.

Many of these prior art shade assemblies that are used as security shades are built in numerous variations and with multiple lengths for a single model vehicle or a larger vehicle line. For example, many of the security shades are typically mounted in brackets between the interior trim panels inside of a motor vehicle. The distance between the two interior panels varies between cars of the same production by either numerous inches, tenths of the inch or the like, however, the shade assembly must still be able to fit between the panels and not rattle back and forth within the vehicle. Therefore, the ability to have at least a two position end cap that will change the effective overall length of a security shade via the end caps will allow for a single vehicle security shade to be used across numerous vehicle lines, not just a specifically designed built single model security shade as has been the case of most prior art shade assembly systems.

Many of these prior art vehicle security shades have a roller that utilizes end caps at the end of the rollers and generally either one or both of them are spring loaded on respective ends of the rollers. To install the rollers, end caps are compressed to fit the roller into the brackets and when released the spring restraints in the end caps use an axially outward force against the bracket on the trim panels, keeping the roller in place within the vehicle interior. Many of these spring loaded designs also provide a self centering action which allows for easy installation or removal of such security shades with one hand.

There have been many attempts within the prior art to secure the roller within the brackets, which has been met with relative amounts of success. Generally, many of these devices typically add weight and/or cost to the shade and offer limited advantages over the floating end caps thus making the shades significantly more difficult to install or remove. Therefore, there is a need in the prior art for a novel and improved end cap for use with a security shade or shade assembly within a vehicle. There also is a need in the prior art for a two piece removable end cap that will reduce the length of the shade assemblies by allowing a single shade assembly to be used over a variety of vehicle lines having a variety of lengths by adjusting the end caps within the interior of the vehicles. Furthermore, there is a need in the art for an end cap that will be a two piece removable end cap that can be used on one or both ends of a roller system to effectively allow for three variations of length. This will reduce the cost and manufacturing time of the vehicle security shade for use across multiple vehicle lines of an automotive manufacturer.

SUMMARY OF THE INVENTION

One object of the present invention may be to provide an improved end cap for use in a vehicle.

Another object of the present invention may be to provide a two piece removable end cap for use in an automotive vehicle.

Still another object of the present invention may be to provide a two piece removable end cap that is capable of operating within a motor vehicle interior at predetermined lengths.

Still another object of the present invention may be to provide an end cap for a vehicle shade assembly that is easier to manufacturer and reduce costs to the automotive manufacturer.

Still another object of the present invention may be to provide an end cap for use on a security shade that is capable of being used across multiple vehicle lines and models for an automotive manufacturer.

Yet another object of the present invention may be to provide a vehicle security shade that includes a two piece end cap arranged on one or both ends of the security shade system.

To achieve the foregoing objects, a shade assembly for use in a vehicle is disclosed. The shade assembly includes a cassette having a slot therein, a roll tube arranged within the cassette and a shade panel connected to the roll tube. The shade also includes a two piece end cap arranged on an end of the cassette wherein the two piece end cap includes a base end cap and a removable extension arranged on an end of the base end cap for use of the shade at its widest position in the vehicle. The removable extension is removed to use the shade at its narrow most position in the vehicle.

One advantage of the present invention may be that it provides a novel and improved end cap for use with the vehicle shade assembly in a vehicle.

A further advantage of the present invention may be that it allows for an adjustable effective length of the security shade via the use of a two piece removable end cap on one or both ends of the security shade.

Still another advantage of the present invention may be that it provides for the use of a novel end cap that is capable of being used with a security shade over numerous vehicle lines of an automotive manufacturer.

Yet a further advantage of the present invention may be that it creates an easy to manufacture end cap and an end cap that reduces costs to the automotive manufacturer.

Still another advantage of the present invention is that it may provide a two piece end cap that effectively reduces the length of an end cap by an entire length of the removable extension thereof.

Other objects, features and advantages of the present invention will become apparent from the subsequent description and the appended claims, taken in conjunction with the accompanying drawings.

BRIEF DESCRIPTION OF THE DRAWINGS

FIG. 7 shows a bottom view of a two piece end cap according to the present invention.

FIG. 8 shows a close up view of the bottom portion of the two piece removable end cap according to the present invention.

FIG. 9 shows a section view depicting a two piece removable end cap according to the present invention.

DESCRIPTION OF THE EMBODIMENT(S)

Figure 1:
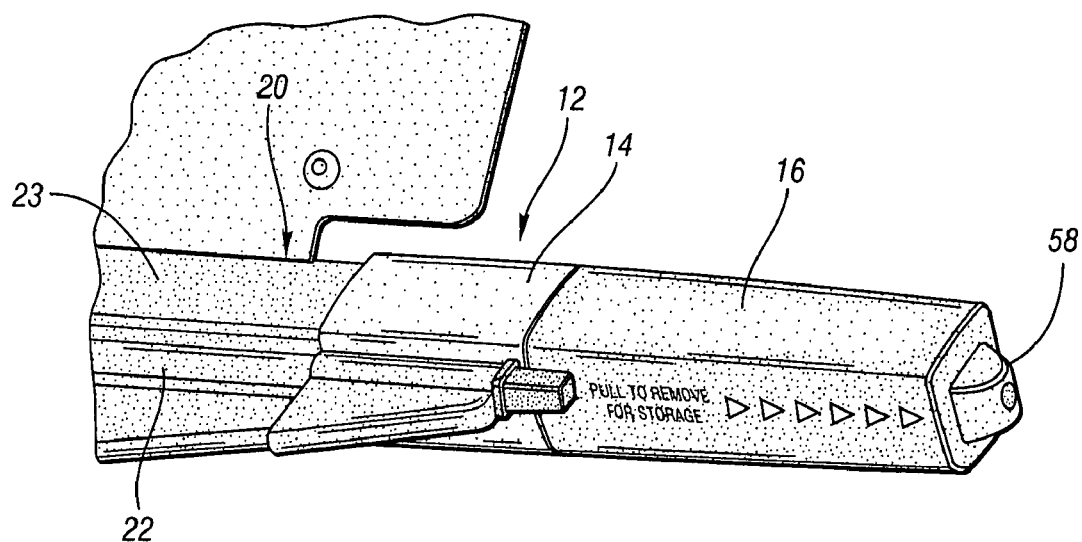
FIG. 1 shows a shade assembly with an end cap according to the present invention for use in a vehicle.

Referring to the drawings, an end cap 10 for use in a security shade assembly 12 within a vehicle is disclosed. It should be noted that the end cap 10 shown is a two piece removable end cap that is capable of being used in two different positions to reduce its effective length and hence, the effective length of the vehicle shade assembly 12 for use in an automotive vehicle. It should be noted that the end cap 10 can be used on one or both ends of the vehicle shade assembly 12 thus allowing for up to three different effective lengths for a vehicle shade assembly 12 according to the present invention. The two piece removable end cap 10 according to the present invention may allow for an automotive manufacturer to use one shade assembly 12 over numerous vehicle lines and vehicle models within the vehicle lines of such automotive manufacturers. This may in effect reduce the cost of designing and manufacturing the end caps 10 for shade assemblies 12 within the interior of automotive vehicles. It should further be noted that the end cap 10 may be used in or with any type of shade assembly 12 within an automotive vehicle including but not limited to security shades, shades covering automotive windows, rollers for barrier nets, and any other type of shade or barrier that is used in automotive or other type of vehicle. The end cap 10 according to the present invention may allow for ease of use of the person installing such into an automotive vehicle or for the consumer who purchases such device in an aftermarket capacity.

Figure 2:
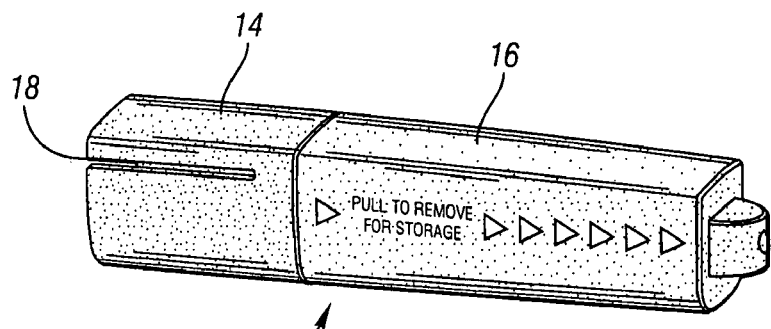
FIG. 2 shows a two piece removable end cap according to the present invention in its widest position.
Figure 3:
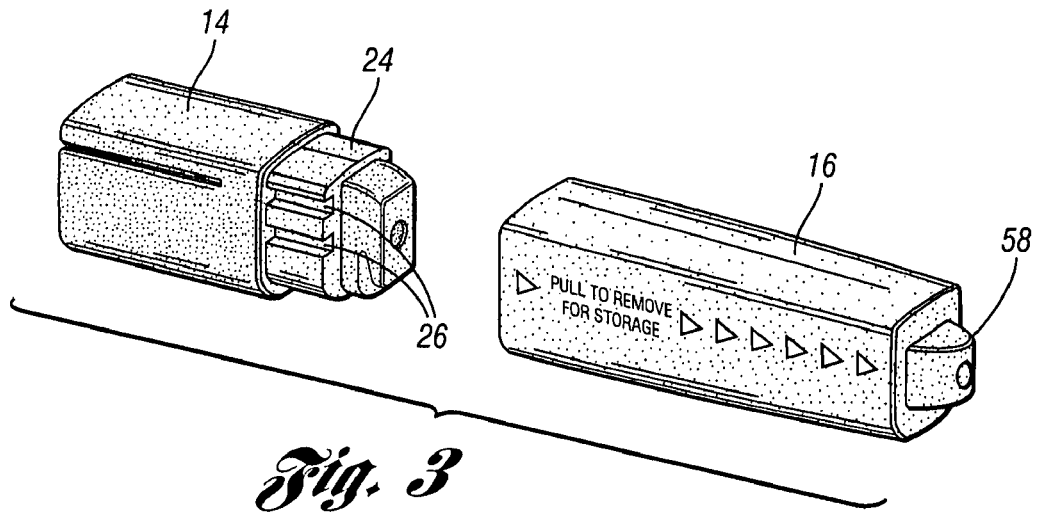
FIG. 3 shows a two piece end cap according to the present invention with the removable extension removed for its narrow most position.
Figure 4:
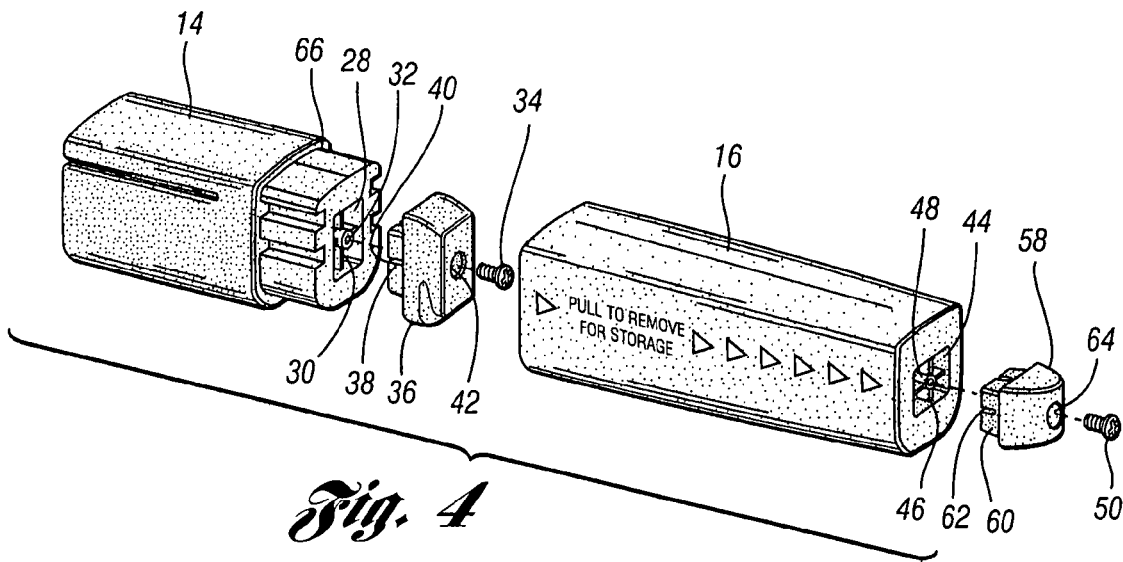
FIG. 4 shows an exploded view of the two piece removable end cap according to the present invention.
Figure 5:
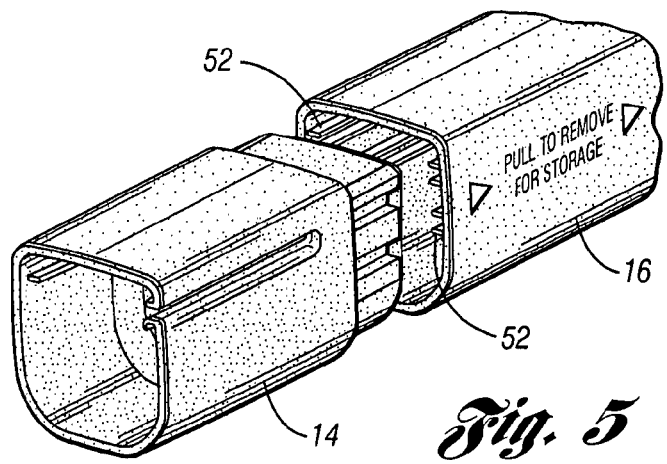
FIG. 5 shows a perspective view of the two piece removable end cap according to the present invention.
Figure 6:
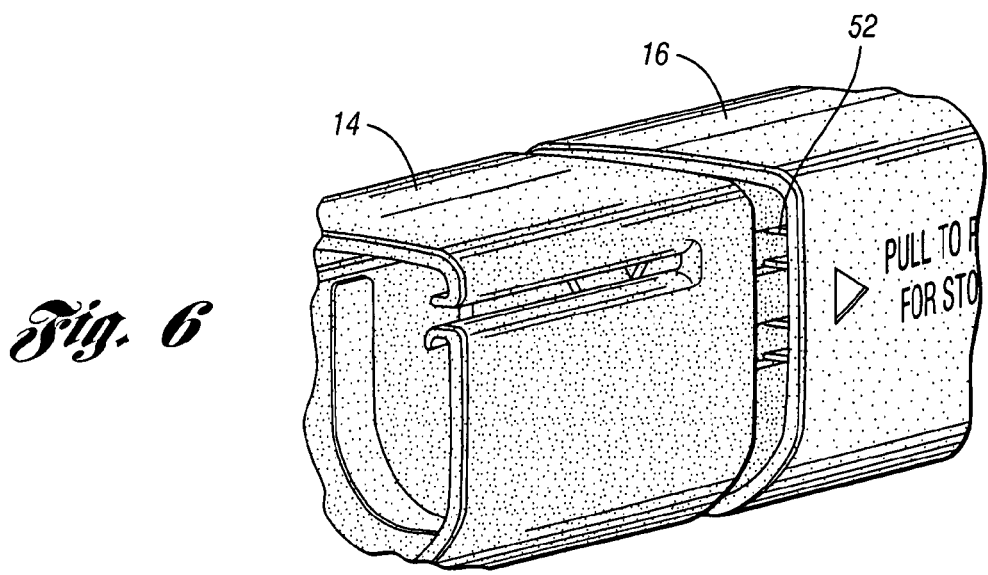
FIG. 6 shows a close up perspective view of the two piece end cap according to the present invention.

FIGS. 1 through 9 show a two piece removable end cap 10 according to an embodiment of the present invention. The end cap 10 includes a base end cap 14 and a removable extension 16 that may be arranged over an end of the base end cap 14. The base end cap 14 has a slot 18 arranged in one surface thereof. The slot 18 is arranged adjacent to an open end of the base end cap 14. Generally, the base end cap 14 is made of a hollow plastic body formed by injection molding or some other suitable or well known process. However, it should be appreciated that the base end cap 14 may be formed or stamped with any other metal, ceramic, any soft or hard type of plastic, composite or natural material depending on the design requirements of the end cap.

In the embodiment shown the end cap 10 is mounted at one or both ends of a shade assembly 12 for use in a vehicle interior. The vehicle shade assembly 12 generally includes a roller 20 and a shade panel 22 attached at one end thereof to the roller 20. The roller 20 may be arranged within the base end cap 14 such that the base end cap 14 will be positioned to secure the roller 20 and shade panel 22 within the vehicle interior for deployment of the flexible shade panel 22 over a predetermined portion of the vehicle such as a cargo area or the like. The slot 18 in the base end cap 14 may receive and allow for a portion or edge of the flexible shade panel 22 to wind and unwind around the roller 20 thus allowing the shade panel 22 to pass therethrough while the base end cap 14 secures the shade assembly 12 within a motor vehicle without disturbing the shade panel 22 in its extended or stored positions. In one embodiment the end cap 10 is fixed to the shade assembly 12 and in another contemplated embodiment a cassette may be arranged over the roller 20 and shade panel 22 and engages the end cap 10 at a predetermined portion thereof or by having the end cap 10 arranged over the cassette 23 thus providing further protection to the shade panel 22 within the shade assembly 12 of the automotive vehicle.

The two piece removable end cap 10 according to the present invention includes the base end cap 14 and a removable extension 16. The base end cap 14, as described above, includes a slot 18 therein and generally has a hollow body. The base end cap 14 includes a reduced neck portion 24 extending from one end thereof. The base end cap 14 generally includes four walls with the slot 18 arranged in one of those walls. The base end cap 14 also includes on the reduced neck portion 24 extending from an end thereof at least one groove or slot 26 on a side surface thereof. In the embodiment shown a first and second slot 26 are arranged therein and parallel one another. The base end cap 14 first and second grooves 26 extend a predetermined distance into the side surface of the base end cap 14. It should be noted that the embodiment as shown shows two grooves 26 arranged in each side surface of the reduced neck portion 24 of the base end cap 14, however only one groove 26 may be arranged therein or multiple grooves may be arranged therein depending on the design requirements of the two piece removable end cap 10. It should also be noted that generally the slot 18 of the base end cap 14 may be on the same side as at least one of the grooves 26 in the reduced neck portion 24 of the base end cap 14. However, it is also contemplated to have the slot 18 on any of the other walls of the base end cap 14. It is also contemplated to have the grooves 26 in the reduced neck portion 24 of the base end cap 14 on only one side surface thereof or on any of the other surfaces thereof depending on the design requirements of the base end cap 14. The base end cap 14 also may include a generally rectangular shaped cavity 28 on an end face thereof. The end face in one embodiment is on the end of the reduced neck portion 24 of the base end cap 14. It should be noted that in the embodiment contemplated a rectangular cavity 28 is arranged therein, however any other shaped cavity may also be arranged therein. Arranged within the cavity 28 of the base end cap 14 is a generally cross or key shaped aligning member 30. It should be noted that any other shaped member may be arranged within the cavity 28. Generally, at a center point of the cross key 30 in the cavity 28 of the base end cap 14 is arranged a cylindrical member 32. This cylindrical member 32 in one contemplated embodiment may be threaded to receive a fastener 34 such as a screw to secure a nose insulator 36 to an end of the base end cap 14. It should be noted that any known shape can be used for the cross or key member 30 arranged within the cavity 28 and any known shape can be used for the cavity 28 of the base end cap 14. The base end cap 14 may also include other ribs, and other supporting structure arranged on the interior or exterior surfaces of the base end cap 14 to allow for a more robust and structurally strong base end cap member 14.

The base end cap 14 may also include a nose insulator 36 arranged on the end face of the base end cap 14. The nose insulator 36 generally may have a rectangular like shape when viewed from a top surface thereof. However, it should be noted that any other known shape can be used for the nose insulator 36 depending on the design requirements for the two piece removable end cap 10. The nose insulator 36 may have a rectangular shaped aligning member 38 extending from a surface thereof. The aligning member 38 in one embodiment will have a rectangular shape, however any other shape may be used for the aligning member 38 extending from a surface thereof. The shape of the member 38 generally will mimic that of the shape of the cavity 28 in the end face of the base end cap 14. The member 38 extending from the nose insulator 36 also may have a cross shaped groove 40 therein along with a circular orifice 42 arranged along a generally mid point thereof. These cross shaped grooves 40 will align with the cross shaped member 30 arranged within the cavity 28 of the base end cap 14. This will ensure that the nose insulator 36 and base end cap 14 will be properly aligned with respect to one another when the nose insulator 36 is secured to an end of the base end cap 14. The nose insulator 36 may have any known shape but will be able to align with and mate with an interior surface of the removable extension 16. The nose insulator 36 also may include an orifice 42 through a center point thereof that will allow a fastener 34 to be passed therethrough and interengage with the cavity 28 in the end of the base end cap 14. In one contemplated embodiment the fastener 34 is a screw, however any other type of fastener may be used to connect the nose insulator 36 to the end of the base end cap 14. It should also be noted that other types of connecting methodologies other than a fastener may also be used including but not limited to gluing, interference fits, etc. It should be noted that the nose insulator 36 generally is made from a plastic material, however any other known metal, ceramic, rubber, plastic, composite, or natural material may also be used for the nose insulator 36.

The two piece removable end cap 10 further includes a removable extension 16. The removable extension 16 generally has a hollow body with a first, second, third and fourth wall that generally mimic that of the base end cap 14. One end of the removable extension 16 is enclosed with a wall. The other end of the removable extension 16 generally is open. The extension 16 will have a predetermined length that is determined based on the automotive vehicle in which the security shade assembly 12 will be arranged. It should also be noted that the base end cap 14 may also have a predetermined length based on the same requirements. The removable extension 16 may include a cavity 44 arranged within an end face of the removable extension 16. The cavity 44 generally will have a rectangular shape. However, any other shaped cavity may also be used in the end of the removable extension 16. The cavity 44 in the end of the removable extension 16 generally may have a cross shaped member or cross key member 46 arranged therein. The cross shaped member 46 generally may have a cylindrical member 48 arranged at a cross point thereof. The cylindrical member 48 generally will have a cylindrical orifice along an interior thereof wherein the orifice may be threaded to accommodate and hold a fastener 50 therein. It should be noted that any shaped member may be arranged within the cavity 44 other than the cross shaped member 46 as described above and shown in the figures. It should further be noted that the removable extension 16 generally is made of a plastic material, however any other metal, ceramic, composite, rubber, natural material or the like may also be used for the removable extension 16. The removable extension 16 may include having at least one set of ribs 52 arranged on at least one inside surface thereof. In the embodiment shown a first set and second set of ribs 52 are arranged parallel to one another on a side surface of the inside surface of the removable extension 16. It is also contemplated to use a first and second set of ribs 52 on the opposite inner side wall of the removable extension 16. The ribs 52 arranged on the inside surface of the removable extension 16 may be used to interact with and interengage with the grooves 26 on the outside surface of the base end cap 14. These grooves 26 and ribs 52 may align and stabilize one another to create a stabilized two piece end cap 10 which includes the base end cap 14 and the removable extension 16. The ribs 52 extend a predetermined distance inside the removable extension 16. It should also be noted that instead of having individual ribs 52 it is also contemplated to have one rib that includes solid material between what is shown as a first and second rib in the drawings. It should be noted that it is contemplated to have the ribs 52 arranged on both of the inside side surfaces of the removable extension 16, on only one inside side surface of the removable extension 16 or on any of the other inside wall surfaces of the removable extension 16.

The removable extension 16 also may include a generally circular orifice 54 through one of the walls thereof. This generally circular orifice 54 may be arranged at or near the open end of the removable extension 16. It should be contemplated that any other shaped orifice or hole other than circular may also be used in the present invention. The orifice 54 through one surface of the removable extension 16 may be used to interact and engage with a locking finger 56 having a raised member 58. The locking finger 56 is arranged on an outside surface of the base end cap 14. Generally, the locking finger 56 is arranged on the reduced neck portion 24 on the base end cap 14. The locking finger 56 is arranged on the surface such that the raised member 58 near or on the end of the locking finger 56 is urged, by a spring force, in a generally outward direction away from the surface of the base end cap 14. This will ensure that when the base end cap 14 is arranged and secured within the open end of the removable extension 16 by an interference fit or any other known connecting methodology between the grooves 26 and the ribs 52 along with the raised member 58 interacting and engaging within the orifice 54 of the removable extension 16 to ensure that the removable extension 16 does not come dislodged from the base end cap 14 when installing and removing the shade assembly 12 from the vehicle. It should be noted that any other type of locking mechanism or interaction can be used between the removable extension 16 and the base end cap 14, however the locking finger 56 and orifice 54 is the locking mechanism that is shown in the drawings.

The removable extension 16 also may include a nose insulator 58 arranged on an end face thereof. The nose insulator 58 generally is made from a plastic material, however any other soft or hard plastic, rubber, ceramic, metal, composite, natural material or the like may also be used for the nose insulator 58. The nose insulator 58 generally will have any known shape. In the embodiment shown in the figures it generally has a half circular shape. The half circular shape generally is in the form of a half of a disk. Extending from one end, preferably the flat end, of the nose insulator 58 may be a rectangular shaped member 60. It should be noted that the member 60 extending from the surface of the nose insulator 58 for the removable extension 16 may be of any known shape. The member 60 extending from the nose insulator 58 generally will have a cross shaped groove 62 with a circular orifice 64 at a mid point thereof. The cross shaped grooves 62 of the nose insulator 58 and the cross shaped member 46 arranged within the cavity 44 at the end of the removable extension 16 may interact and mate with one another to properly align the nose insulator 58 with the end of the removable extension 16. The cross shaped key 46 will interact with the cross shaped groove 62 and circular orifice 64 of the nose insulator 58 to secure the nose insulator 58 to the removable extension 16. A fastener 50 may then be arranged through the orifice 64 arranged along a center line of the nose insulator 58 to secure the nose insulator 58 to the end of the removable extension 16. In one contemplated embodiment a screw 50 is used as the fastener 50, however any other known fastener may also be used and any other known connecting methodology may be used to connect the nose insulator 58 to the end of the removable extension 16. It should be noted that any known shape can be used for the cavity 44 and extension or plug member on the nose insulator 58 for the removable extension 16. Also, any known shape can be used for the overall shape of the nose insulator 58 arranged on the end face of the removable extension 16.

In operation, the two piece removable end cap 10 is generally used on either one or both ends of the shade assembly 12 depending on the design requirements and length difference needed within an automotive vehicle or across vehicle lines. In its standard position both of the removable extensions 16 would be removed from the end of the base end caps 14 on each end of the shade assemblies. This would create an overall shade assembly 12 that is at its narrowest width available. If and when the vehicle user wants to adjust or increase the length of the end cap 10, the user would take one removable extension 16 and align the ribs 52 on an inside surface thereof with the grooves 26 on the outside surface of the reduced neck portion 24 of the base end cap 14 and slide the removable extension 16 into interengagement with a shoulder 66 of the base end cap 14. This will allow for interaction between the ribs 52 and grooves 26 on both sides of the removable extension 16 and base end cap 14 and between the locking finger 36 and locking orifice 54 of the removable extension 16. The installer or user would push the removable extension 16 until the raised member 58 and locking orifice 54 interact with one another and secure the removable extension 16 to the end of the base end cap 14 such that the ribs 52 and mating grooves 26 may add to the stability of the two piece removable end cap 10. If the length of the shade assembly 12 has to increase by yet another amount, the operator or user would then align and secure a second removable extension 16 onto the opposite base end cap 14 of the shade assembly 12. This would allow for the shade assembly 12 to have a removable extension 16 arranged on each end thereof thus creating the longest length shade assembly 12 for the vehicle in which the user would use the shade assembly. If the user needs to remove the removable extensions 16 to reduce the overall effective length of the shade assembly 12, the user via a finger or other tool would depress and push the raised member 58 in a direction away from the locking orifice 54 of the removable extension 16 and then slide the removable extension 16 from the reduced neck portion 24 of the base end cap 14. The removable extension 16 would then be stored either in the vehicle or outside the vehicle depending on the needs of the automotive vehicle user. The operation of the end cap 10 in either the standard position or lengthened position will not affect the winding and unwinding of the shade panel 22 from the roller tube 20 which is arranged within the base end cap 14 as described above. The length of the removable extension 16 may be subtracted from the overall length of the shade assembly 12, thus allowing the shade assembly 12 to be used in multiple positions within one vehicle or across multiple vehicle lines without having to redesign or manufacture another end cap 10 for such use. This may greatly reduce costs to automotive manufacturers by having to purchase only one shade assembly having the two piece removable end cap 10 arranged on either one or both ends, thus covering an entire vehicle line or all vehicles within an entire automobile manufacturing company.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A support assembly for use on a shade in a vehicle, said support assembly including:
    a base end cap, said base end cap having a generally rectangular shaped cavity in an end face thereof, said cavity having a generally cross shaped key member therein;
    a nose insulator secured to an end of said base end cap, said nose insulator having a generally rectangular shaped member extending from an end thereof, said member having a generally cross shaped groove therein for aligning said nose insulator with respect to said base end cap;
    a removable extension arranged over said nose insulator and a portion of said base end cap; and
    a second nose insulator secured to an end of said removable extension.

2. The support assembly of claim 1 wherein said nose insulator is secured to said base end cap with a fastener.

3. The support assembly of claim 2 wherein said fastener is a screw.

4. The support assembly of claim 1 wherein said second nose insulator is secured to said removable extension with a fastener.

5. The support assembly of claim 4 wherein said fastener is a screw.

6. The support assembly of claim 1 wherein said removable extension having a generally rectangular shaped cavity in an end face thereof.

7. The support assembly of claim 1 wherein said base end cap having at least one slot arranged in surfaces thereof.

8. The support assembly of claim 7 wherein said removable extension having at least one set of ribs arranged on both inside side surfaces thereof, said ribs extend and interengage with said slots to align and stabilize the support assembly of said base end cap to said removable extension.

9. The support assembly of claim 1 further including a locking finger on a surface of said base end cap, said locking finger having a raised member on an end thereof.

10. The support assembly of claim 9 wherein said removable extension having an orifice through a surface thereof, said raised member is arranged within said orifice to help secure said base end cap to said removable extension.

11. A support assembly for use on a shade in a vehicle, said support assembly including:
    a base end cap;
    a nose insulator secured to an end of said base end cap;
    a removable extension arranged over said nose insulator and a portion of said base end cap, said removable extension having a generally rectangular shaped cavity in an end face thereof, said cavity having a generally cross shaped key member therein, said key member having a threaded cylinder at an intersection of said key member; and
    a second nose insulator secured to an end of said removable extension.

* * * * *

UNITED STATES PATENT AND TRADEMARK OFFICE
CERTIFICATE OF CORRECTION

PATENT NO. : 7,591,296 B2
APPLICATION NO. : 11/975213
DATED : September 22, 2009
INVENTOR(S) : Bryan Busha et al.

It is certified that error appears in the above-identified patent and that said Letters Patent is hereby corrected as shown below:

Title page, item [56] References Cited U.S. Patent Documents - insert the missing Reference No. -- 6,183,028 -- in the References Cited Section Signed and Sealed this Tenth Day of November, 2009

David J. Kappos
*Director of the United States Patent and Trademark Office*